US008619069B2

(12) United States Patent
Ko et al.

(10) Patent No.: US 8,619,069 B2
(45) Date of Patent: Dec. 31, 2013

(54) POWER-OFF DISCHARGE CIRCUIT, AND SOURCE DRIVER CIRCUIT HAVING THE SAME

(75) Inventors: Jae-Hong Ko, Seoul (KR); Ho-Hak Rho, Seoul (KR); Do-Yoon Kim, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 761 days.

(21) Appl. No.: 12/825,735

(22) Filed: Jun. 29, 2010

(65) Prior Publication Data

US 2011/0012888 A1 Jan. 20, 2011

(30) Foreign Application Priority Data

Jul. 14, 2009 (KR) ........................ 10-2009-0063967

(51) Int. Cl.
*G06F 3/038* (2013.01)

(52) U.S. Cl.
USPC .............................. 345/212; 345/213; 345/87

(58) Field of Classification Search
None
See application file for complete search history.

(56) References Cited

U.S. PATENT DOCUMENTS

2008/0165099 A1* 7/2008 Cho et al. ........................ 345/87
2008/0259229 A1* 10/2008 Oomura et al. ................... 349/5

FOREIGN PATENT DOCUMENTS

JP 2000-214830 A 8/2000
KR 10-2006-0016285 A 2/2006
KR 10-2008-0064280 A 7/2008

* cited by examiner

*Primary Examiner* — Adam R Giesy
(74) *Attorney, Agent, or Firm* — Sughrue Mion, PLLC

(57) ABSTRACT

A power-off discharge circuit comprises a power voltage detection unit that detects whether a first power voltage for driving a source driver circuit is blocked and generates a discharge control signal, and a discharge unit that discharges a load circuit in a display panel based on the discharge control signal.

16 Claims, 9 Drawing Sheets

POWER-OFF DISCHARGE CIRCUIT, AND SOURCE DRIVER CIRCUIT HAVING THE SAME

CROSS-REFERENCE TO RELATED APPLICATION(S)

This application claims priority under 35 USC §119 to Korean Patent Application No. 2009-0063967, filed on Jul. 14, 2009, in the Korean Intellectual Property Office (KIPO), the contents of which are incorporated herein in its entirety by reference.

BACKGROUND

1. Technical Field

Apparatuses and methods consistent with the exemplary embodiments relate to a display device, and more particularly to a power-off discharge circuit, and a source driver circuit having the same.

2. Description of the Related Art

Generally, a liquid crystal display (LCD) device uses thin film transistors (TFT) as switching elements for turning on or off internal pixels. By operations (i.e., turning on or off the internal pixels) of the thin film transistors, an image is displayed on a display panel of the LCD device. For example, in the LCD device, a gate driver circuit may provide gate driving signals to gate terminals of the thin film transistors, and a source driver circuit may provide source line driving signals to the internal pixels through signal lines coupled to source terminals of the thin film transistors.

However, as the LCD device enters into a power-off state, a power voltage for driving the source driver circuit is blocked. In addition, the source driver circuit is disconnected from a load circuit in the display panel by a switching element placed between the source driver circuit and the load circuit. Thus, the load circuit enters into a floating state where the load circuit includes electric charges supplied by a previous display operation (i.e., residual electric charges). As a result, a vertical stripe ghost image due to the residual electric charges may appear on the display panel of the LCD device.

SUMMARY

Exemplary embodiments provide a power-off discharge circuit which rapidly discharges a load circuit in a display panel of a display device when a power voltage for driving a source driver circuit is blocked as the display device enters into a power-off state.

According to an exemplary embodiment, there is provided a source driver circuit having a power-off discharge circuit.

According to an exemplary embodiment, the power-off discharge circuit may include a power voltage detection unit that detects whether a first power voltage for driving a source driver circuit is blocked to generate a discharge control signal, and a discharge unit that discharges a load circuit in a display panel of a display device based on the discharge control signal.

According to an exemplary embodiment, the display device may be a liquid crystal display (LCD) device.

According to an exemplary embodiment, the load circuit may correspond to one column of the display panel.

According to an exemplary embodiment, the discharge control signal may have a first voltage level when the display device enters into a power-off state. The first voltage level of the discharge control signal may control the load circuit to be discharged.

According to an exemplary embodiment, the first power voltage may be blocked when the display device enters into the power-off state.

According to an exemplary embodiment, the discharge control signal may have a second voltage level when the display device operates in a power-on state. The second voltage level of the discharge control signal may control the load circuit not to be discharged.

According to an exemplary embodiment, the first power voltage may be supplied when the display device operates in the power-on state.

According to an exemplary embodiment, the power-off discharge circuit may further include a driving voltage generation unit that generates a second power voltage for driving the power voltage detection unit based on the first power voltage.

According to an exemplary embodiment, the driving voltage generation unit may generate the second power voltage by performing a voltage division operation on the first power voltage.

According to an exemplary embodiment, the power voltage detection unit may control the discharge control signal to have a voltage level between the second power voltage and a ground voltage.

According to an exemplary embodiment, the power-off discharge circuit may further include a level shift unit that performs a level shifting operation on the voltage level of the discharge control signal based on the first power voltage.

According to an exemplary embodiment, a source driver circuit may include a decoder that decodes digital data indicating a gradation level to generate an analog gradation voltage corresponding to the digital data, an output buffer that amplifies the analog gradation voltage to output a source line driving voltage to a load circuit in a display panel of a display device, a switch that turns off when a first power voltage for driving the source driver circuit is blocked, and that turns on when the first power voltage is supplied, and a power-off discharge circuit that discharges the load circuit when the first power voltage is blocked, and that does not discharge the load circuit when the first power voltage is supplied.

According to an exemplary embodiment, the first power voltage may be blocked when the display device enters into a power-off state. The first power voltage may be supplied when the display device operates in a power-on state.

According to an exemplary embodiment, the power-off discharge circuit may include a power voltage detection unit that detects whether the first power voltage is blocked to generate a discharge control signal, and a discharge unit that discharges the load circuit based on the discharge control signal.

According to an exemplary embodiment, the power-off discharge circuit may further include a driving voltage generation unit that generates a second power voltage for driving the power voltage detection unit based on the first power voltage.

According to an exemplary embodiment, the power-off discharge circuit may further include a level shift unit that performs a level shifting operation on the voltage level of the discharge control signal based on the first power voltage.

According to an exemplary embodiment, a power-off discharge circuit may prevent a vertical stripe ghost image due to residual electric charges from appearing on a display panel of a display device by rapidly discharging a load circuit in the display panel when a power voltage for driving a source driver circuit is blocked as the display device enters into a power-off state.

According to an exemplary embodiment, a source driver circuit having the power-off discharge circuit may prevent a vertical stripe ghost image due to residual electric charges from appearing on a display panel of a display device when the display device enters into a power-off state.

BRIEF DESCRIPTION OF THE DRAWINGS

Illustrative, non-limiting exemplary embodiments will be more clearly understood from the following detailed description taken in conjunction with the accompanying drawings.

DETAILED DESCRIPTION OF THE EXEMPLARY EMBODIMENTS

Figure 1:
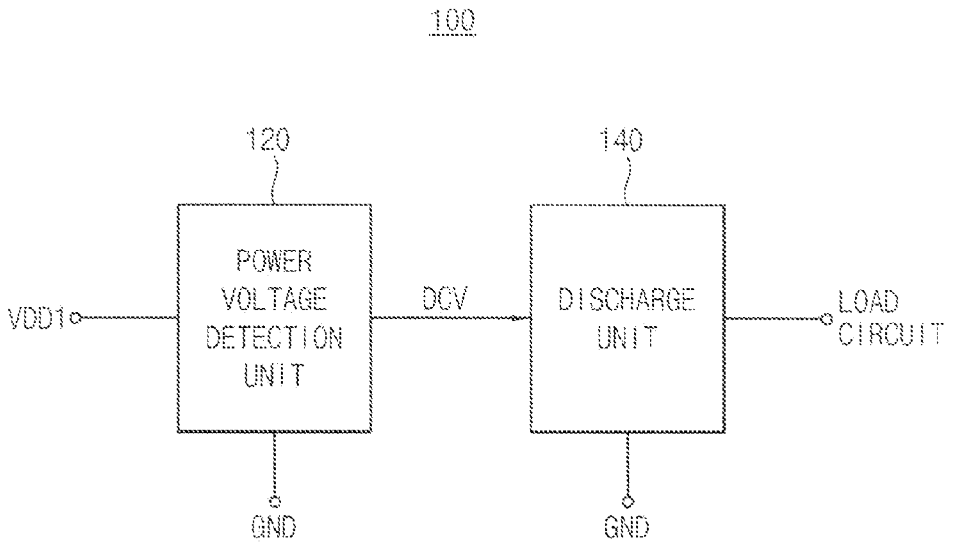
FIG. 1 is a block diagram illustrating a power-off discharge circuit according to an exemplary embodiment.

Various exemplary embodiments will be described more fully hereinafter with reference to the accompanying drawings, in which some exemplary embodiments are shown. The exemplary embodiments may, however, be embodied in many different forms and should not be construed as limited to the exemplary embodiments set forth herein. Rather, these exemplary embodiments are provided so that this disclosure will be thorough and complete, and will fully convey the scope of the exemplary embodiments to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular exemplary embodiments only and is not intended to be limiting of the exemplary embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the exemplary embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a power-off discharge circuit according to an exemplary embodiment.

Referring to FIG. 1, the power-off discharge circuit 100 may include a power voltage detection unit 120 and a discharge unit 140.

Generally, a source driver circuit is disconnected from a load circuit in a display panel when a first power voltage VDD1 for driving the source driver circuit is blocked as a display device enters into a power-off state. As a result, the load circuit enters into a floating state while the load circuit includes electric charges supplied by a previous display operation (i.e., residual electric charges). The residual electric charges are naturally discharged during a certain time period. During the certain time period, a vertical stripe ghost image due to the residual electric charges may appear on the display panel. In order to prevent the vertical stripe ghost image due to the residual electric charges from appearing on the display panel when the display device enters into the power-off state, the power-off discharge circuit 100 is provided. The power-off discharge circuit includes the power voltage detection unit 120 and the discharge unit 140. Hereinafter operations of the power voltage detection unit 120 and the discharge unit 140 will be described in detail.

The power voltage detection unit 120 generates a discharge control signal DCV by detecting whether the first power voltage VDD1 is blocked. In detail, when the first power voltage VDD1 is blocked as the display device enters into the power-off state, the power voltage detection unit 120 detects that the first power voltage VDD1 is blocked, and generates the discharge control signal DCV having a first voltage level (e.g., logical HIGH level). The discharge control signal DCV having the first voltage level controls the discharge unit 140 to discharge the load circuit in the display panel. On the other hand, when the first power voltage VDD1 is supplied as the display device operates in a power-on state, the power voltage detection unit 120 detects that the first power voltage VDD1 is supplied, and generates the discharge control signal DCV having a second voltage level (e.g., logical LOW level). The discharge control signal DCV having the second voltage level controls the discharge unit 140 not to discharge the load circuit in the display panel.

The discharge unit 140 discharges the load circuit in the display panel based on the discharge control signal DCV outputted from the power voltage detection unit 120. In detail, when the discharge control signal DCV outputted from the power voltage detection unit 120 has the first voltage level (e.g., logical HIGH level), the discharge unit 140 couples the load circuit to a ground voltage GND. Thus, the load circuit may be rapidly discharged. On the other hand, when the discharge control signal DCV outputted from the power voltage detection unit 120 has the second voltage level (e.g., logical LOW level), the discharge unit 140 does not couple the load circuit to the ground voltage GND. Thus, the display device may perform display operations.

As described above, when the first power voltage VDD1 is blocked as the display device enters into the power-off state, the power-off discharge circuit 100 may prevent the vertical stripe ghost image due to the residual electric charges from appearing on the display panel by rapidly discharging the load circuit in the display panel. On the other hand, when the first power voltage VDD1 is supplied as the display device operates in the power-on state, the power-off discharge circuit 100 may not influence on the display operations of the display device, since the load circuit is not coupled to the ground voltage GND.

Figure 2:
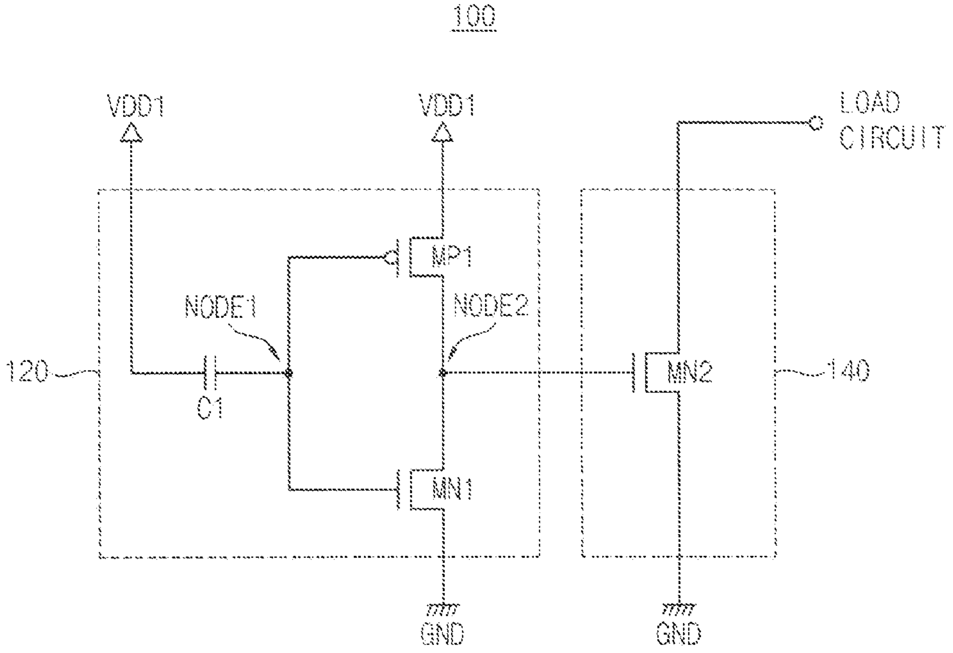
FIG. 2 is a circuit diagram illustrating a power-off discharge circuit of FIG. 1.

FIG. 2 is a circuit diagram illustrating a power-off discharge circuit of FIG. 1.

Referring to FIG. 2, the power-off discharge circuit 100 may include the power voltage detection unit 120 and the discharge unit 140. In an exemplary embodiment, the power voltage detection unit 120 may include a first capacitor C1, a first P-type metal oxide semiconductor (PMOS) transistor MP1, and an N-type metal oxide semiconductor (NMOS) transistor MN1. The discharge unit 140 may include a second NMOS transistor MN2.

In the power voltage detection unit 120, a first terminal of the first capacitor C1 is coupled to the first power voltage VDD1, and a second terminal of the first capacitor C1 is coupled to a first node NODE1. The first PMOS transistor MP1 and the first NMOS transistor MN1 constitute an inverter, which inverts a voltage of the first node NODE1 to output an inverted voltage to a second node NODE2. In detail, when the first power voltage VDD1 is blocked as the display device enters into the power-off state, the voltage of the first node NODE1 has logical LOW level by the first capacitor C1. Thus, the voltage of the second node NODE2 has logical HIGH level by the inverter consisting of the first PMOS transistor MP1 and the first NMOS transistor MN1. On the other hand, when the first power voltage VDD1 is supplied as the display device operates in the power-on state, the voltage of the first node NODE1 has logical HIGH level by the first capacitor C1. Thus, the voltage of the second node NODE2 has logical LOW level by the inverter consisting of the first PMOS transistor MP1 and the first NMOS transistor MN1.

In the discharge unit 140, a first terminal of the second NMOS transistor MN2 is coupled to the load circuit in the display panel, a second terminal of the second NMOS transistor MN2 is coupled to the ground voltage GND, and a gate terminal of the second NMOS transistor MN2 is coupled to the second node NODE2. As described above, when the first power voltage VDD1 is blocked as the display device enters into the power-off state, the voltage of the second node NODE2 has logical HIGH level. As a result, the second NMOS transistor MN2 turns on, so that the load circuit may be coupled to the ground voltage GND. Thus, the vertical stripe ghost image due to the residual electric charges may be prevented from appearing on the display panel by rapidly discharging the load circuit. On the other hand, when the first power voltage VDD1 is supplied as the display device operates in the power-on state, the voltage of the second node NODE2 has logical LOW level. As a result, the second NMOS transistor MN2 turns off, so that the load circuit may not be coupled to the ground voltage GND. Thus, the display device may perform the display operations without any influence of the power-off discharge circuit 100.

Figure 3:
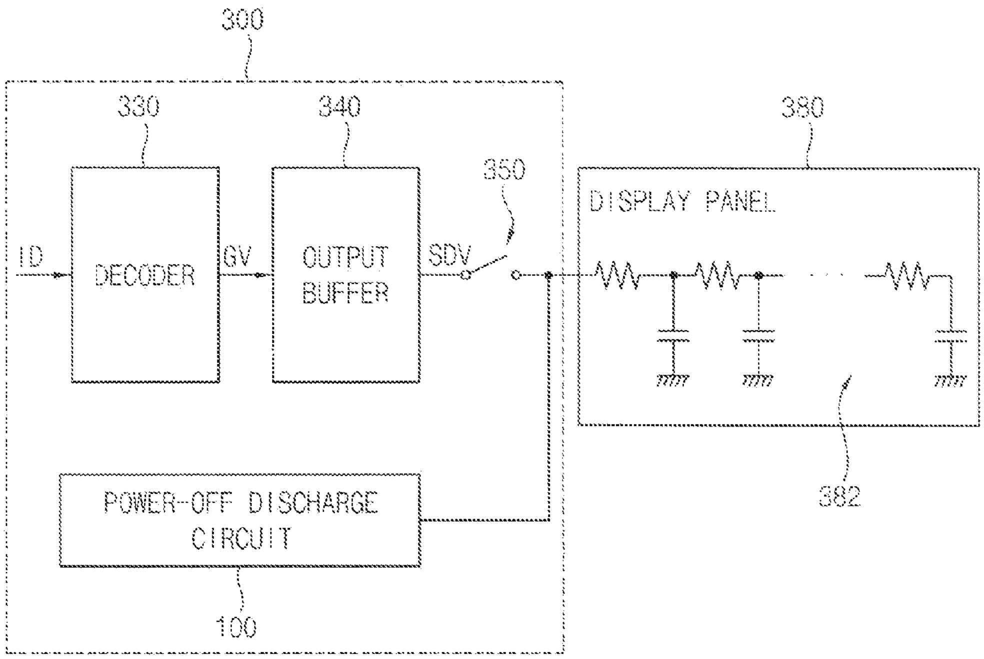
FIG. 3 is a block diagram illustrating a source driver circuit having a power-off discharge circuit of FIG. 1.

FIG. 3 is a block diagram illustrating a source driver circuit having a power-off discharge circuit of FIG. 1.

Referring to FIG. 3, the source driver circuit 300 may include the power-off discharge circuit 100, a decoder 330, an output buffer 340, and a switch 350. The source driver circuit 300 may be coupled to the load circuit 382 in the display panel 380. Here, the decoder 330, the output buffer 340, the switch 350, and the load circuit 382 may constitute one unit structure. Thus, a plurality of unit structures may be included in the display device. For example, the number of channels may be 600 through 1000 when the number of the unit structures is 600 through 1000.

The decoder 300 decodes a digital data ID indicating a gradation level to output an analog gradation voltage GV corresponding to the digital data ID. The output buffer 340 amplifies the analog gradation voltage GV outputted from the decoder 330 to output a source line driving voltage SDV to the load circuit 382 in the display panel 380. The switch 350 turns off when the first power voltage VDD1 for driving the source driver circuit 300 is blocked as the display device enters into the power-off state, and turns on when the first power voltage VDD1 for driving the source driver circuit 300 is supplied as the display device operates in the power-on state. By operation of the switch 350, the source line driving voltage SDV may not be outputted to the load circuit 382 in the display panel 380 when the display device enters in the power-off state, and the source line driving voltage SDV may be outputted to the load circuit 382 in the display panel 380 when the display device operates in the power-on state. The load circuit 382 in the display panel 380 may correspond to one column of the display panel 380. Thus, the load circuit 382 in the display panel 380 may perform the display operations for one column of the display panel 380 based on the source line driving voltage SDV outputted from the source driver circuit 300. Since operations of the decoder 330, the output buffer 340, the switch 350, and the load circuit 382 are well-known in the art, the detail description of the decoder 330, the output buffer 340, the switch 350, and the load circuit 382 will be omitted.

As described above, the power-off discharge circuit 100 discharges the load circuit 382 in the display panel 380 when the first power voltage VDD1 is blocked as the display device enters into the power-off state, and may not discharge the load circuit 382 in the display panel 380 when the first power voltage VDD1 is supplied as the display device operates in the power-on state. For these operations, the power-off discharge circuit 100 may include the power voltage detection unit 120 and the discharge unit 140. Since operations of the power-off discharge circuit 100 are described above, the detail description of the power-off discharge circuit 100 will be omitted. The source driver circuit 300 having the power-off discharge circuit 100 may prevent the vertical stripe ghost image due to the residual electric charges from appearing on the display panel 380 when the display device enters into the power-off state. That is, the source driver circuit 300 having the power-off discharge circuit 100 may perform a clear display function when the display device enters into the power-off state.

Figure 4:
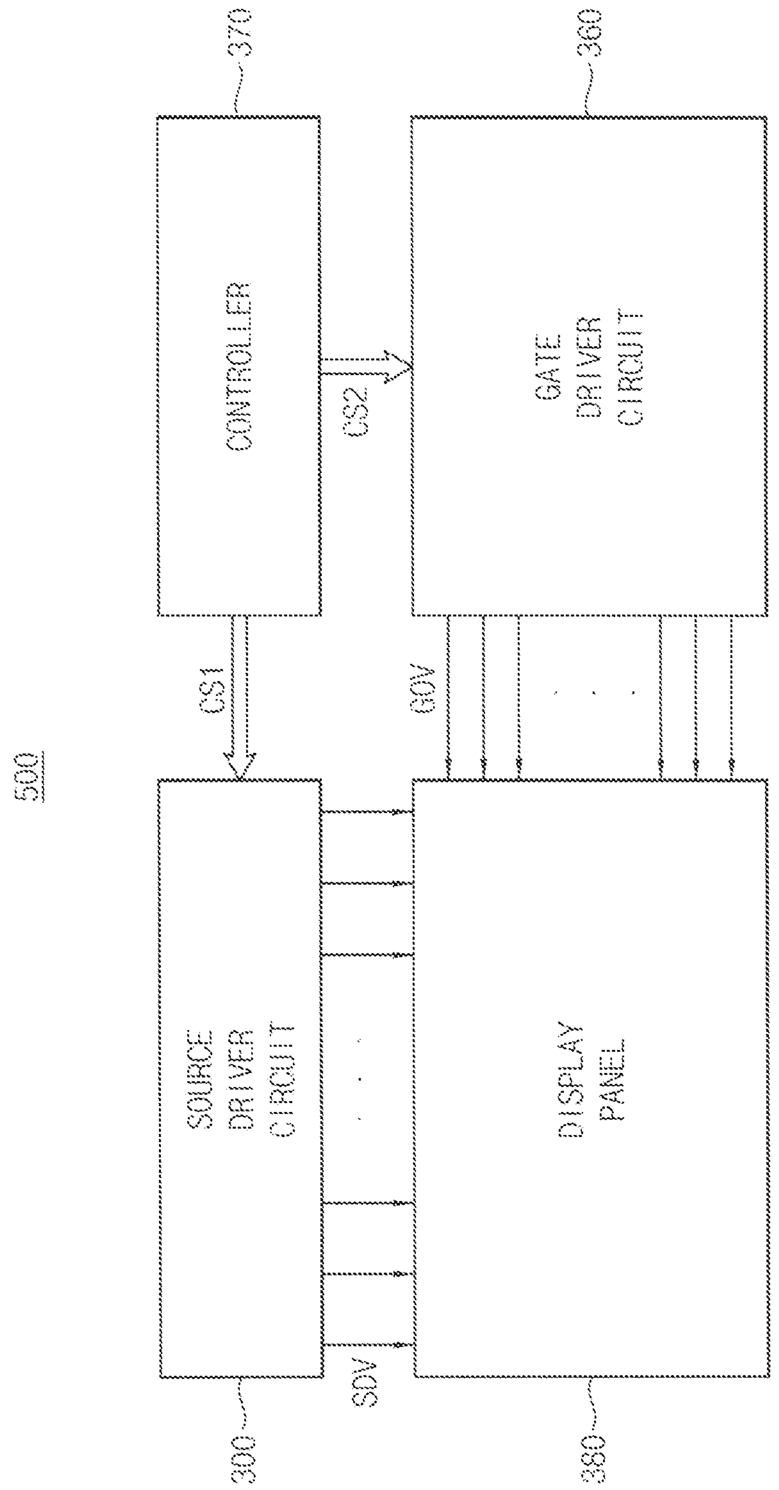
FIG. 4 is a block diagram illustrating a display device having a source driver circuit of FIG. 3.

FIG. 4 is a block diagram illustrating a display device having a source driver circuit of FIG. 3.

Referring to FIG. 4, the display device 500 may include the source driver circuit 300, a gate driver circuit 360, a controller 370, and a display panel 380.

In the display device 500, the source driver circuit 300 provides source line driving voltages SDV to data lines of the display panel 380. The gate driver circuit 360 provides gate on voltages GOV to gate lines of the display panel 380. That is, the display device 500 may output an image on the display panel 380 by operations of the source driver circuit 300 and the gate driver circuit 360. In addition, the controller 370 provides source driver control signals CS1 and gate driver control signals CS2 to the source driver circuit 300 and the gate driver circuit 360, respectively. That is, the source driver circuit 300 and the gate driver circuit 360 may be controlled by the controller 370. Since operations of the source driver circuit 300, the gate driver circuit 360, controller 370, and the display panel 380 are well-known in the art, the detail description of the source driver circuit 300, the gate driver circuit 360, controller 370, and the display panel 380 will be omitted.

The source driver circuit 300 having the power-off discharge circuit 100 may discharge the load circuit 382 in the display panel 380 when the first power voltage VDD1 is blocked as the display device 500 enters into the power-off state, and may not discharge the load circuit 382 in the display panel 380 when the first power voltage VDD1 is supplied as the display device 500 operates in the power-on state. Thus, the source driver circuit 300 having the power-off discharge circuit 100 may perform the clear display function when the display device 500 enters into the power-off state, and may output the source line driving voltages SDV to data lines of the display panel 380 when the display device 500 operates in the power-on state. For these operations, the power-off discharge circuit 100 in the source driver circuit 300 may include the power voltage detection unit 120 and the discharge unit 140. Since operations of the power-off discharge circuit 100 in the source driver circuit 300 is described above, the detail description of the power-off discharge circuit 100 in the source driver circuit 300 will be omitted.

Figure 5:
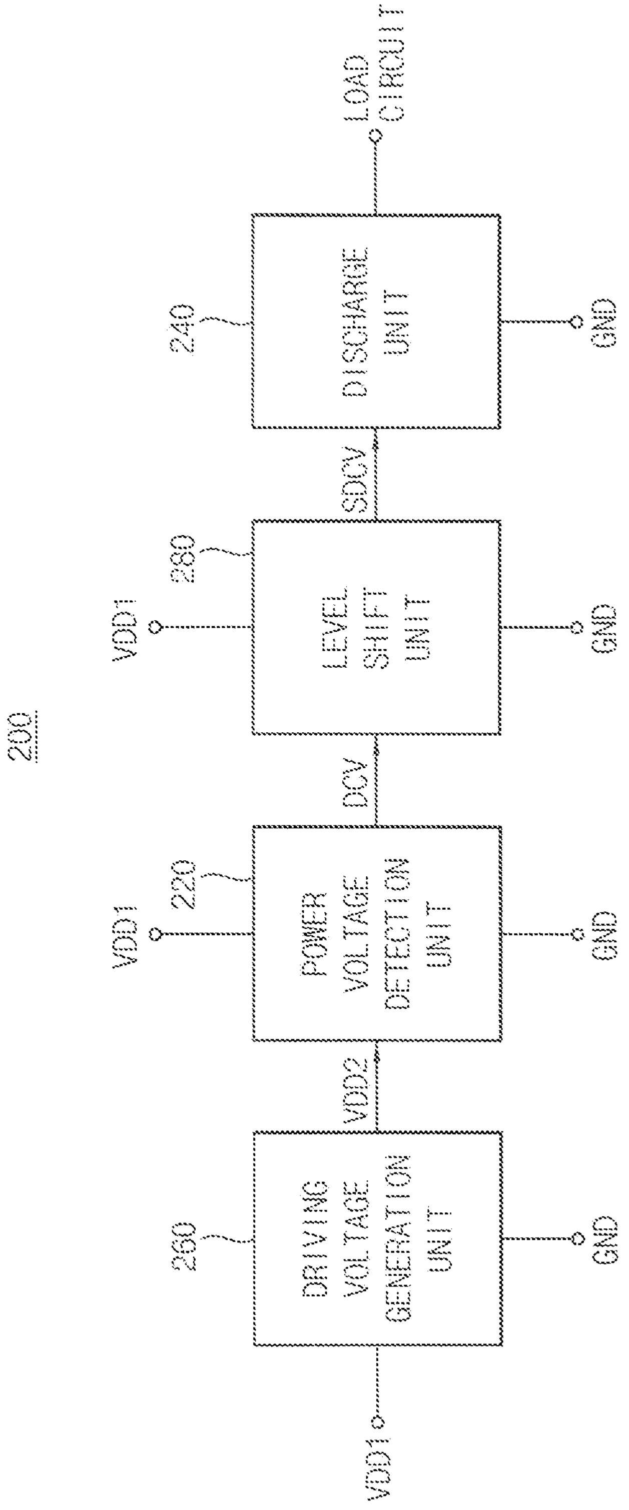
FIG. 5 is a block diagram illustrating a power-off discharge circuit according to an exemplary embodiment.

FIG. 5 is a block diagram illustrating a power-off discharge circuit according to an exemplary embodiment.

Referring to FIG. 5, the power-off discharge circuit 200 may include a power voltage detection unit 220, a discharge unit 240, a driving voltage generation unit 260, and a level shift unit 280.

The driving voltage generation unit 260 generates a second power voltage VDD2 for driving the power voltage detection unit 220 based on a first power voltage VDD1 for driving a source driver circuit. In an exemplary embodiment, the driving voltage generation unit 260 may generate the second power voltage VDD2 by decreasing the first power voltage VDD1 (e.g., performing a voltage division operation on the first power voltage VDD1), and may provide the second power voltage VDD2 to the power voltage detection unit 220. Thus, the power voltage detection unit 220 may operate based on the second power voltage VDD2. Here, when a voltage level of the second power voltage VDD2 is relatively high, the power voltage detection unit 220 may operate slowly. Therefore, a malfunction of a display device due to a power glitch may be prevented. On the other hand, when the voltage level of the second power voltage VDD2 is relatively low, the power voltage detection unit 220 may operate quickly. Therefore, a malfunction of the display device due to the power glitch may result. Thus, the voltage level of the second power voltage VDD2 may be determined by a circuit designer according to required conditions. Preferably, the voltage level of the second power voltage VDD2 may be determined as ⅗ of the voltage level of the first power voltage VDD1. In this case, the malfunction of the display device due to the power glitch may be prevented in so far as a fluctuated voltage level of the first power voltage VDD1 due to the power glitch is above the voltage level of the second power voltage VDD2.

The power voltage detection unit 220 generates a discharge control signal DCV by detecting whether the first power voltage VDD1 is blocked. In detail, when the first power voltage VDD1 is blocked as the display device enters into a power-off state, the power voltage detection unit 220 detects that the first power voltage VDD1 is blocked, and generates the discharge control signal DCV having a first voltage level (e.g., logical HIGH level). The discharge control signal DCV having the first voltage level controls the discharge unit 240 to discharge the load circuit in the display panel. On the other hand, when the first power voltage VDD1 is supplied as the display device operates in a power-on state, the power voltage detection unit 220 detects that the first power voltage VDD1 is supplied, and generates the discharge control signal DCV having a second voltage level (e.g., logical LOW level). The discharge control signal DCV having the second voltage level controls the discharge unit 240 not to discharge the load circuit in the display panel.

Further, the power voltage detection unit 220 operates based on the second power voltage VDD2 generated by the driving voltage generation unit 260. A voltage level of the discharge control signal DCV may be controlled between the second power voltage VDD2 and the ground voltage GND. Generally, when the first power voltage VDD1 is blocked as the display device enters into the power-off state, a negative voltage may be provided to internal elements (e.g., transistors) of the power voltage detection unit 220. In this case, the internal elements may be damaged by the negative voltage. In addition, when the first power voltage VDD1 is supplied as the display device operates in the power-on state, the power voltage detection unit 220 may operate based on the first power voltage VDD1. In this case, the malfunction of the display device may be caused because the first power voltage VDD1 is provided to the internal elements of the power voltage detection unit 220. Thus, the voltage level of the discharge control signal DCV may be controlled between the second power voltage VDD2 and the ground voltage GND.

The level shift unit 280 performs a level shifting operation on the voltage level of the discharge control signal DCV based on the first power voltage VDD1. In detail, when the first power voltage VDD1 is blocked as the display device enters into the power-off state, the voltage level of the second power voltage VDD2 decreases as the voltage level of the first power voltage VDD1 decreases. Here, since the discharge control signal DCV is generated based on the second power voltage VDD2 having a lower voltage level compared to the first power voltage VDD1, the discharge control signal DCV may have an insufficient voltage level for controlling the discharge unit 240. Thus, the level shift unit 280 may solve this problem by performing the level shifting operation on the voltage level of the discharge control signal DCV based on the first power voltage VDD1. That is, the level shift unit 280 generates a boost-up discharge control signal SDCV.

The discharge unit 240 discharges the load circuit in the display panel based on the boost-up discharge control signal SDCV outputted from the level shift unit 280. In detail, when the boost-up discharge control signal SDCV outputted from the level shift unit 280 has the first voltage level, the discharge unit 240 couples the load circuit in the display panel to the ground voltage GND. Thus, the load circuit may be rapidly discharged. That is, the boost-up discharge control signal SDCV having the first voltage level controls the discharge unit 240 to discharge the load circuit in the display panel. On the other hand, when the boost-up discharge control signal SDCV outputted from the level shift unit 280 has the second voltage level, the discharge unit 240 does not couple the load circuit in the display panel to the ground voltage GND. Thus, the display device may perform display operations, normally. That is, the boost-up discharge control signal SDCV having the second voltage level controls the discharge unit 240 not to discharge the load circuit in the display panel.

As described above, when the first power voltage VDD1 is blocked as the display device enters into the power-off state, the power-off discharge circuit 200 may prevent a vertical stripe ghost image resulting from residual electric charges from appearing on the display panel by rapidly discharging the load circuit in the display panel. On the other hand, when the first power voltage VDD1 is supplied as the display device operates in the power-on state, the power-off discharge circuit 200 may not influence the display operations of the display device since the load circuit in the display panel is not coupled to the ground voltage GND.

Figure 6:
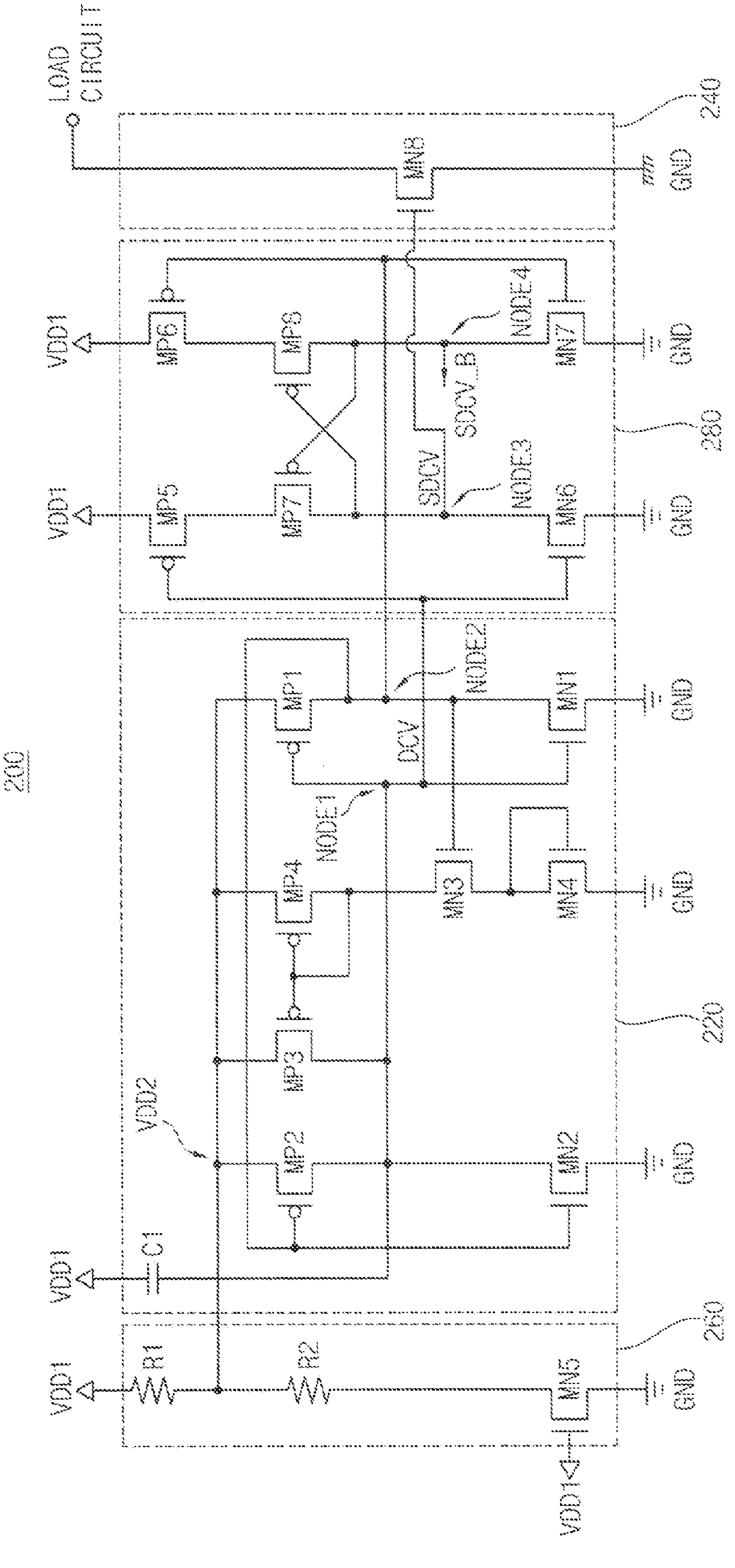
FIG. 6 is a circuit diagram illustrating a power-off discharge circuit of FIG. 5.

FIG. 6 is a circuit diagram illustrating a power-off discharge circuit of FIG. 5.

Referring to FIG. 6, the power-off discharge circuit 200 may include the power voltage detection unit 220, the discharge unit 240, the driving voltage generation unit 260, and the level shift unit 280. In an exemplary embodiment, the power voltage detection unit 220 may include a first capacitor C1, a first through fourth PMOS transistor MP1 through MP4, and a first through fourth NMOS transistors MN1 through MN4. The driving voltage generation unit 260 may include a first resistor R1, a second resistor R2, and a fifth NMOS transistor MN5. The level shift unit 280 may include a fifth through eighth PMOS transistors MP5 through MP8, and a sixth and seventh NMOS transistors MN6 and MN7. The discharge unit 240 may include an eighth NMOS transistor MN8.

In the driving voltage generation unit 260, a first terminal of the first resistor R1 is coupled to the first power voltage VDD1, and a second terminal of the first resistor R1 is coupled to a first terminal of the second resistor R2. A second terminal of the second resistor R2 is coupled to a first terminal of the fifth NMOS transistor MN5. A second terminal of the fifth NMOS transistor MN5 is coupled to the ground voltage GND, and a gate terminal of the fifth NMOS transistor MN5 is coupled to the first power voltage VDD1. The second power voltage VDD2 may be generated by performing the voltage division operation on the first power voltage VDD1 using the first resistor R1 and the second resistor R2.

In the power voltage detection unit 220, the first PMOS transistor MP1 and the first NMOS transistor MN1 constitutes an inverter, which may invert a voltage of the first node NODE1 to output an inverted voltage to a second node NODE2. In detail, a first terminal of the first capacitor C1 is coupled to the first power voltage VDD1, and a second terminal of the first capacitor C1 is coupled to the first node NODE1. A first terminal of the second PMOS transistor MP2 is coupled to the second power voltage VDD2, a second terminal of the second PMOS transistor MP2 is coupled to the first node NODE1, and a gate terminal of the second PMOS transistor MP2 is coupled to the second node NODE2. A first terminal of the second NMOS transistor MN2 is coupled to the first node NODE1, a second terminal of the second NMOS transistor MN2 is coupled to the ground voltage GND, and a gate terminal of the second NMOS transistor MN2 is coupled to the second node NODE2.

The third and fourth PMOS transistor MP3 and MP4 constitute a current mirror. A first terminal of the third PMOS transistor MP3 is coupled to the second power voltage VDD2, a second terminal of the third PMOS transistor MP3 is coupled to the first node NODE1, and a gate terminal of the third PMOS transistor MP3 is coupled to a gate terminal of the fourth PMOS transistor MP4. A first terminal of the fourth PMOS transistor MP4 is coupled to the second power voltage VDD2, a second terminal of the fourth PMOS transistor MP4 is coupled to a first terminal of the third NMOS transistor MN3, and the gate terminal of the fourth PMOS transistor MP4 is coupled to the second terminal of the fourth PMOS transistor MP4. A second terminal of the third NMOS transistor MN3 is coupled to a first terminal of the fourth NMOS transistor MN4, and a gate terminal of the third NMOS transistor MN3 is coupled to the second node NODE2. A second terminal of the fourth NMOS transistor MN4 is coupled to the ground voltage GND, and a gate terminal of the fourth NMOS transistor MN4 is coupled to the first terminal of the fourth NMOS transistor MN4.

In detail, when the first power voltage VDD1 is blocked as the display device enters into the power-off state, the voltage of the first node NODE1 has logical LOW level by the first capacitor C1. Thus, the voltage of the second node NODE2 has logical HIGH level by the inverter consisting of the first PMOS transistor MP1 and the first NMOS transistor MN1. Thus, the second NMOS transistor MN2, the third NMOS transistor MN3, the third PMOS transistor MP3, and the fourth PMOS transistor MP4 turn on. As a result, the voltage of the first node NODE1 may be controlled to be higher than the ground voltage GND. That is, the power voltage detection unit 220 controls the voltage of the first node NODE1 to be higher than the ground voltage GND when the first power voltage VDD1 is blocked as the display device enters into the power-off state, so that the negative voltage may not be applied into the gate terminal of the first PMOS transistor MP1 and the gate terminal of the first NMOS transistor MN1. Thus, the first PMOS transistor MP1 and the first NMOS transistor MN1 may not be damaged by the negative voltage.

On the other hand, when the first power voltage VDD1 is supplied as the display device operates in the power-on state, the voltage of the first node NODE1 has logical HIGH level by the first capacitor C1. Thus, the voltage of the second node NODE2 has logical LOW level by the inverter consisting of the first PMOS transistor MP1 and the first NMOS transistor MN1. Thus, the first NMOS transistor MN1 and the second PMOS transistor MP2 turn on. As a result, the voltage of the first node NODE1 may be controlled to be lower than the second power voltage VDD2. That is, the power voltage detection unit 220 controls the voltage of the first node NODE1 to be lower than the second power voltage VDD2 when the first power voltage VDD1 is applied as the display device operates in the power-on state, so that the malfunction of the display device may be prevented.

In the level shift unit 280, a first terminal of the fifth PMOS transistor MP5 is coupled to the first power voltage VDD1, a second terminal of the fifth PMOS transistor MP5 is coupled to a first terminal of the seventh PMOS transistor MP7, and a gate terminal of the fifth PMOS transistor MP5 is coupled to the first node NODE1. A first terminal of the sixth PMOS transistor MP6 is coupled to the first power voltage VDD1, a second terminal of the sixth PMOS transistor MP6 is coupled to a first terminal of the eighth PMOS transistor MP8, and a gate terminal of the sixth PMOS transistor MP6 is coupled to the second node NODE2. A second terminal of the seventh PMOS transistor MP7 is coupled to the third node NODE3, and a gate terminal of the seventh PMOS transistor MP7 is coupled to the fourth node NODE4. A second terminal of the eighth PMOS transistor MP8 is coupled to the fourth node NODE4, and a gate terminal of the eighth PMOS transistor MP8 is coupled to the third node NODE3. A first terminal of the sixth NMOS transistor MN6 is coupled to the third node NODE3, a second terminal of the sixth NMOS transistor MN6 is coupled to the ground voltage GND, and a gate terminal of the sixth NMOS transistor MN6 is coupled to the first node NODE1. A first terminal of the seventh NMOS transistor MN7 is coupled to the fourth node NODE4, a second terminal of the seventh NMOS transistor MN7 is coupled to the ground voltage GND, and a gate terminal of the seventh NMOS transistor MN7 is coupled to the second node NODE2.

In detail, when the first power voltage VDD1 is blocked as the display device enters into the power-off state, the voltage of the first node NODE1 has logical LOW level, and the voltage of the second node NODE2 has logical HIGH level. In this case, the fifth PMOS transistor MP5, the seventh NMOS transistor MN7, and the seventh PMOS transistor MP7 turn on, so that the third node NODE3 may have the voltage of logical HIGH level corresponding to the first power voltage VDD1, and the fourth node NODE4 may have the voltage of logical LOW level corresponding to the ground voltage GND. Thus, the level shift unit 280 outputs the boost-up discharge control signal SDCV of logical HIGH level corresponding to the first power voltage VDD1. On the other hand, when the first power voltage VDD1 is supplied as the display device operates in the power-on state, the voltage of the first node NODE1 has logical HIGH level, and the voltage of the second node NODE2 has logical LOW level. In this case, the sixth PMOS transistor MP6, the sixth NMOS transistor MN6, and the eighth PMOS transistor MP8 turn on, so that the third node NODE3 may have the voltage of logical LOW level corresponding to the ground voltage GND, and the fourth node NODE4 may have the voltage of logical HIGH level corresponding to the first power voltage VDD1. Thus, the level shift unit 280 outputs the boost-up discharge control signal SDCV of logical LOW level corresponding to the ground voltage GND.

As described above, when the first power voltage VDD1 is blocked as the display device enters into the power-off state, the voltage level of the second power voltage VDD2 decreases as the voltage level of the first power voltage VDD1 decreases. Here, since the discharge control signal DCV is generated based on the second power voltage VDD2 having the lower voltage level compared to the first power voltage VDD1, the discharge control signal DCV may have the insufficient voltage level for controlling the discharge unit 240. Thus, the level shift unit 280 performs the level shifting operation on the voltage level of the discharge control signal DCV based on the first power voltage VDD1. That is, the level shift unit 280 generates the boost-up discharge control signal SDCV having sufficient voltage level for controlling the discharge unit 240 to output the boost-up discharge control signal SDCV to the discharge unit 240.

In the discharge unit 240, a first terminal of the eighth NMOS transistor MN8 is coupled to the load circuit in the display panel, a second terminal of the eighth NMOS transistor MN8 is coupled to the ground voltage GND, and a gate terminal of the eighth NMOS transistor MN8 is coupled to the third node NODE3. As described above, when the first power voltage VDD1 is blocked as the display device enters into the power-off state, the voltage of the third node NODE3 has logical HIGH level. As a result, the eighth NMOS transistor MN8 turns on, so that the load circuit may be coupled to the ground voltage GND. Thus, the vertical stripe ghost image due to the residual electric charges may be prevented from appearing on the display panel because the load circuit is rapidly discharged. On the other hand, when the first power voltage VDD1 is supplied as the display device operates in the power-on state, the voltage of the third node NODE3 has logical LOW level. As a result, the eighth NMOS transistor MN8 turns off, so that the load circuit may not be coupled to the ground voltage GND. Thus, the display device may perform the display operations without any influence of the power-off discharge circuit 200.

Figure 7:
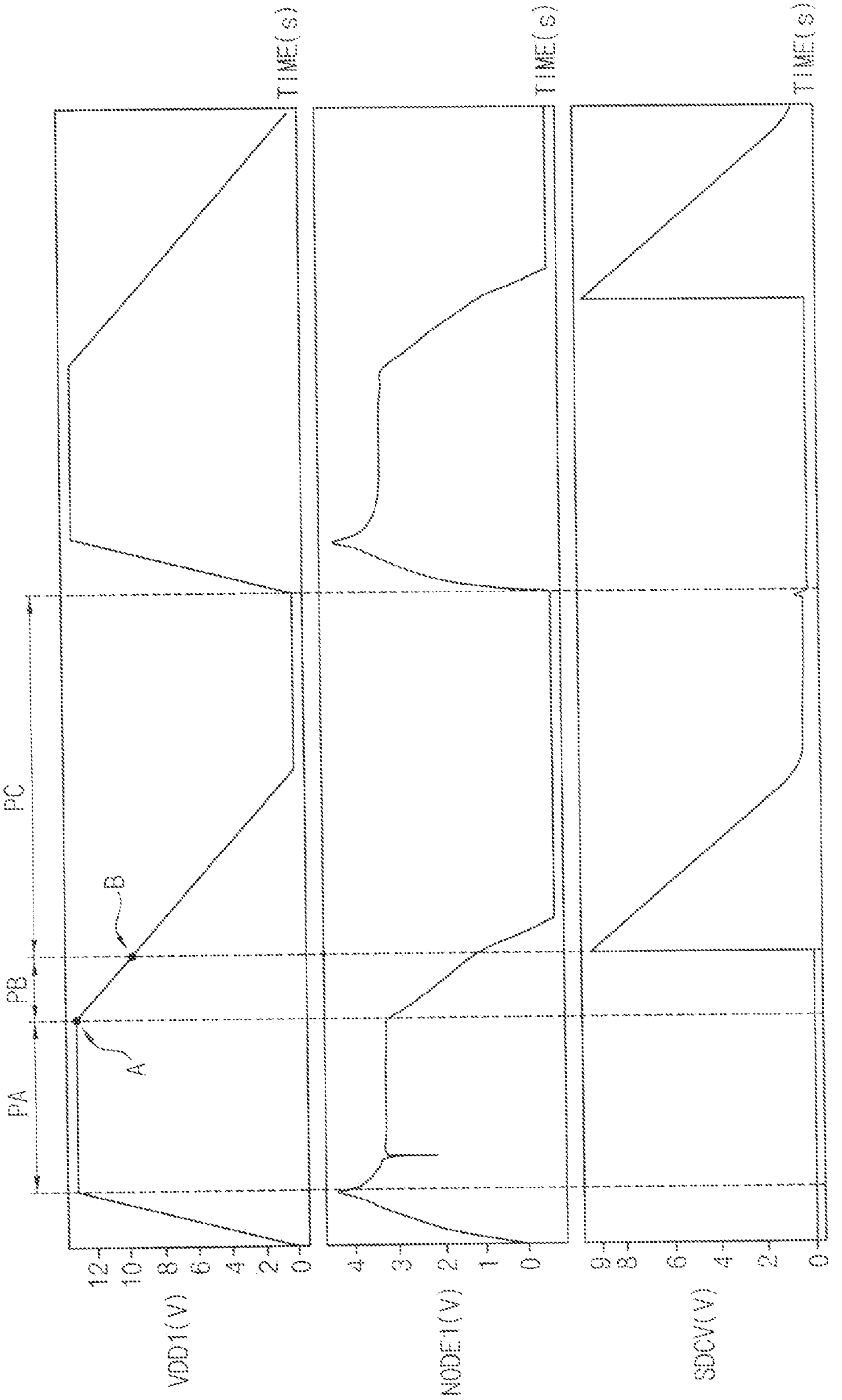
FIG. 7 is a graph illustrating a simulation result of a power-off discharge circuit of FIG. 5.

FIG. 7 is a graph illustrating a simulation result of a power-off discharge circuit of FIG. 5.

Referring to FIG. 7, in a first period PA where the first power voltage VDD1 for driving the source driver circuit is supplied as the display device operates in the power-on state, the first node NODE1 has the voltage of logical HIGH level. Then, the boost-up discharge control signal SDCV of logical LOW level is outputted at the third node NODE3. Thus, the load circuit in the display panel may not be discharged because the load circuit in the display panel is not coupled to the ground voltage GND. In addition, when the first power voltage VDD1 for driving the source driver circuit is blocked as the display device enters into the power-off state, in a second period PB, the voltage level of the boost-up discharge control signal is maintained as logical LOW level. Thus, the load circuit in the display panel may not be discharged because the load circuit is not coupled to the ground voltage GND. The second period may be from a first timing point A where the voltage level of the first power voltage VDD1 begins to decrease to a second timing point B where the voltage level of the first power voltage VDD1 reaches a predetermined voltage level.

At the second timing point B, the voltage level of the boost-up discharge control signal SDCV is changed from logical LOW level to logical HIGH level. In a third period PC, the load circuit in the display panel is coupled to the ground voltage GND, so that the load circuit in the display panel may be discharged. In the third period PC, the voltage of the first node NODE1 is controlled to be higher than the negative voltage by the power voltage detection unit 220. Thus, while the power-off discharge circuit 200 discharges the load circuit in the display panel, the first PMOS transistor MP1 and the first NMOS transistor MN1 in the power voltage detection unit 220 may not be damaged. In the third period PC, a waveform of the boost-up discharge control signal SDCV may be similar to a waveform of the first power voltage VDD1 because the level shift unit 280 performs the level shifting operation on the voltage level of the discharge control signal DCV based on the first power voltage VDD1 to generate the boost-up discharge control signal SDCV.

Figure 8:
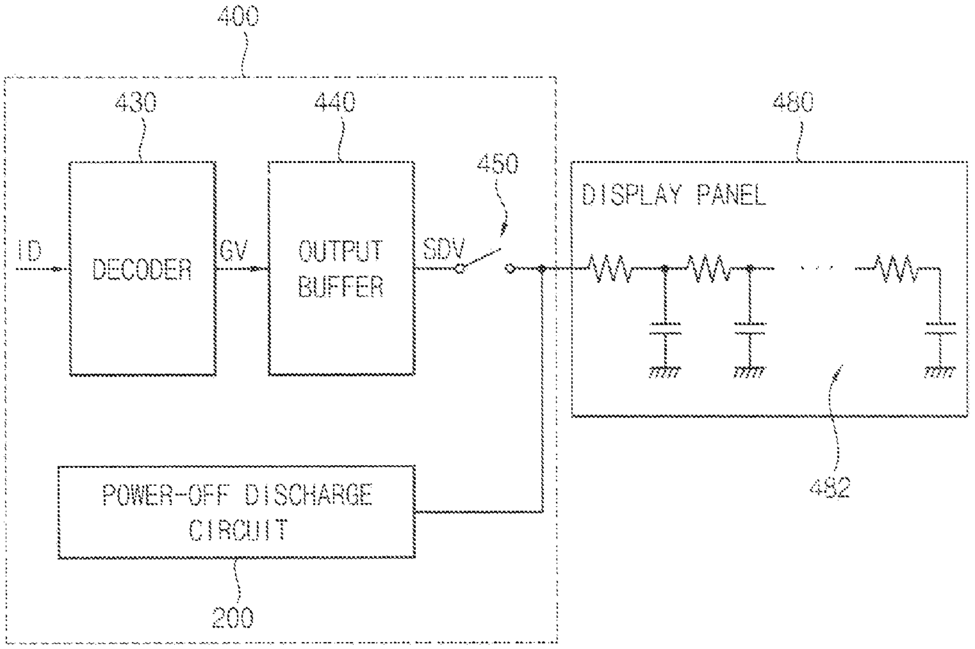
FIG. 8 is a block diagram illustrating a source driver circuit having a power-off discharge circuit of FIG. 5.

FIG. 8 is a block diagram illustrating a source driver circuit having a power-off discharge circuit of FIG. 5.

Referring to FIG. 8, the source driver circuit 400 may include the power-off discharge circuit 200, a decoder 430, an output buffer 440, and a switch 450. The source driver circuit 400 may be coupled to the load circuit 482 in the display panel 480. Here, the decoder 430, the output buffer 440, the switch 450, and the load circuit 482 may constitute one unit structure. Thus, a plurality of unit structures may be included in the display device. For example, the number of channels may be 600 through 1000 when the number of the unit structures is 600 through 1000.

The decoder 430 decodes a digital data ID indicating a gradation level to output an analog gradation voltage GV corresponding to the digital data ID. The output buffer 440 amplifies the analog gradation voltage GV outputted from the decoder 430 to output a source line driving voltage SDV to the load circuit 482 in the display panel 480. The switch 450 turns off when the first power voltage VDD1 for driving the source driver circuit 400 is blocked as the display device enters into the power-off state, and turns on when the first power voltage VDD1 for driving the source driver circuit 400 is supplied as the display device operates in the power-on state. By operations of the switch 450, the source line driving voltage SDV may not be outputted to the load circuit 482 in the display panel 480 when the display device enters in the power-off state, and the source line driving voltage SDV may be outputted to the load circuit 482 in the display panel 480 when the display device operates in the power-on state. The load circuit 482 in the display panel 480 may correspond to one column of the display panel 480. The load circuit 482 in the display panel 480 performs the display operations based on the source line driving voltage SDV outputted from the source driver circuit 400. Since operations of the decoder 430, the output buffer 440, the switch 450, and the load circuit 482 are well-known in the art, the detail description of the decoder 430, the output buffer 440, the switch 450, and the load circuit 482 will be omitted.

As described above, the power-off discharge circuit 200 may discharge the load circuit 482 in the display panel 480 when the first power voltage VDD1 is blocked as the display device enters into the power-off state, and may not discharge the load circuit 482 when the first power voltage VDD1 is supplied as the display device operates in the power-on state. For these operations, the power-off discharge circuit 200 may include the driving voltage generation unit 260, the power voltage detection unit 220, the level shift unit 280, and the discharge unit 240. Since operations of the power-off discharge circuit 200 are described above, the detail description of the power-off discharge circuit 200 will be omitted. Thus, the source driver circuit 400 having the power-off discharge circuit 200 may prevent the vertical stripe ghost image due to the residual electric charges from appearing on the display panel 480 when the display device enters into the power-off state. That is, the source driver circuit 400 having the power-off discharge circuit 200 may perform a clear display function when the display device enters into the power-off state.

Figure 9:
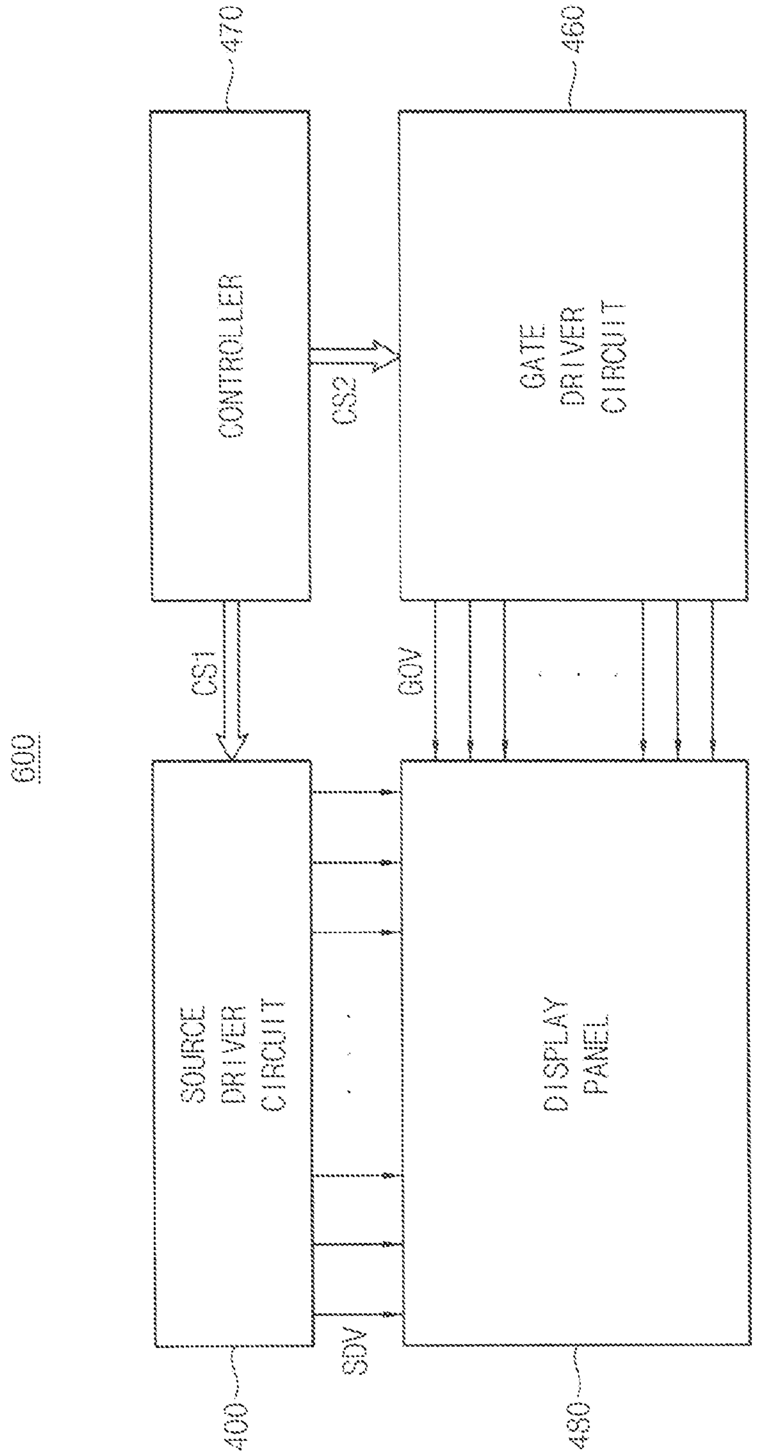
FIG. 9 is a block diagram illustrating a display device having a source driver circuit of FIG. 8.

FIG. 9 is a block diagram illustrating a display device having a source driver circuit of FIG. 8.

Referring to FIG. 9, the display device 600 may include the source driver circuit 400, a gate driver circuit 460, a controller 470, and a display panel 480.

In the display device 600, the source driver circuit 400 provides source line driving voltages SDV to data lines of the display panel 480, and the gate driver circuit 460 provides gate on voltages (GOV) to gate lines of the display panel 480. That is, the display device 600 may output an image on the display panel 480 by operations of the source driver circuit 400 and the gate driver circuit 460. In addition, the controller 470 provides source driver control signals CS1 and gate driver control signals CS2 to the source driver circuit 400 and the gate driver circuit 460, respectively. Thus, the source driver circuit 400 and the gate driver circuit 460 may be controlled by the controller 470. Since operations of the source driver circuit 400, the gate driver circuit 460, controller 470, and the display panel 480 are well-known in the art, the detail description of the source driver circuit 400, the gate driver circuit 460, controller 470, and the display panel 480 will be omitted.

The source driver circuit 400 having the power-off discharge circuit 200 discharges the load circuit 482 in the display panel 480 when the first power voltage VDD1 is blocked as the display device 600 enters into the power-off state, and may not discharge the load circuit 482 in the display panel 480 when the first power voltage VDD1 is supplied as the display device 600 operates in the power-on state. Thus, the source driver circuit 400 having the power-off discharge circuit 200 may perform the clear display function when the display device 600 enters into the power-off state, and may output the source line driving voltages SDV to data lines of the display panel 480 when the display device 600 operates in the power-on state. For these operations, the power-off discharge circuit 200 in the source driver circuit 400 may include the driving voltage generation unit 260, the power voltage detection unit 220, the level shift unit 280, and the discharge unit 240. Since operations of the power-off discharge circuit 200 are described above, the detail description of the power-off discharge circuit 200 will be omitted.

Figure 10:
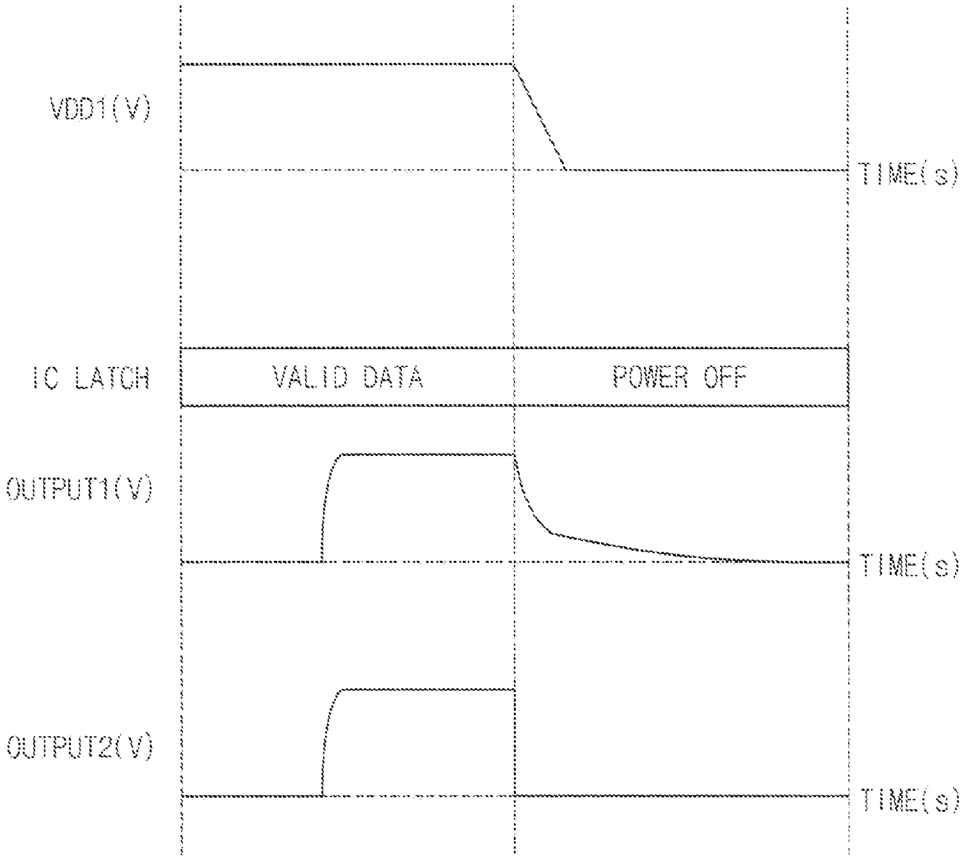
FIG. 10 is a graph illustrating an output of a source driver circuit with a power-off discharge circuit and an output of a source driver circuit without a power-off discharge circuit.

FIG. 10 is a graph illustrating an output of a source driver circuit with a power-off discharge circuit and an output of a source driver circuit without a power-off discharge circuit.

Referring to FIG. 10, an image may be displayed on a display panel of a display device in a first period VALID DATA where a first power voltage VDD1 for driving a source driver circuit is supplied as the display device operates in a power-on state. On the other hand, an image may not be displayed on the display panel in a second period POWER OFF where the first power voltage VDD1 for driving the source driver circuit is blocked as the display device enters into a power-off state. However, according to an output OUTPUT1 of the source driver without the power-off discharge circuit, a vertical stripe ghost image due to residual electric charges may be displayed on the display panel of the display device because a load circuit in the display panel includes the residual electric charges in the second period POWER OFF. On the other hand, according to an output OUTPUT2 of the source driver with the power-off discharge circuit, the vertical stripe ghost image due to the residual electric charges may not be displayed on the display panel of the display device because the load circuit in the display panel does not include the residual electric charges in the second period POWER OFF. Thus, the source driver circuit with the power-off discharge circuit may perform a clear display function when the display device enters into the power-off state.

As described above, a power-off discharge circuit of the exemplary embodiments may rapidly discharge a load circuit in a display panel of a display device when a power voltage for driving a source driver circuit is blocked as the display device enters into a power-off state. In addition, a source driver circuit of the exemplary embodiments may prevent a vertical stripe ghost image due to residual electric charges from appearing on the display panel of a display device using a power-off discharge circuit when a power voltage for driving a source driver circuit is blocked as the display device enters into a power-off state. The power-off discharge circuit and the source driver circuit may be applied to a display device such as a LCD display device, etc.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the exemplary embodiments. Accordingly, all such modifications are intended to be included within the scope of the exemplary embodiments as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A power-off discharge circuit of a source driver circuit of a display device, the power-off discharge circuit comprising:

a power voltage detection unit which detects whether a first power voltage which drives a source driver circuit is blocked and generates a discharge control signal for discharging a load circuit in a display panel of the display device upon detection that the first power voltage is blocked; and a discharge unit which discharges the load circuit based on the discharge control signal by coupling the load circuit to substantially a ground voltage.

2. The circuit of claim 1, wherein the display device is a liquid crystal display (LCD) device.

3. The circuit of claim 2, wherein the load circuit corresponds to one column of the display panel.

4. The circuit of claim 1, wherein the discharge control signal has a first voltage level when the source driver circuit enters into a power-off state, the first voltage level of the discharge control signal controlling the load circuit to be discharged.

5. The circuit of claim 4, wherein the first power voltage is blocked when the source driver circuit enters into the power-off state.

6. The circuit of claim 1, wherein the discharge control signal has a second voltage level when the source driver circuit operates in a power-on state, and the second voltage level of the discharge control signal controls the load circuit so that the load circuit is not discharged.

7. The circuit of claim 6, wherein the first power voltage is supplied when the source driver circuit operates in the power-on state.

8. The circuit of claim 1, further comprising:

a driving voltage generation unit which generates a second power voltage which drives the power voltage detection unit based on the first power voltage.

9. The circuit of claim 8, wherein the driving voltage generation unit generates the second power voltage by performing a voltage division operation on the first power voltage.

10. The circuit of claim 9, wherein the power voltage detection unit controls the discharge control signal to have a voltage level between the second power voltage and a ground voltage.

11. The circuit of claim 10, further comprising:

a level shift unit which performs a level shifting operation on the voltage level of the discharge control signal based on the first power voltage.

12. A source driver circuit, comprising:

a decoder which decodes a digital data which indicates a gradation level to generate an analog gradation voltage corresponding to the digital data;

an output buffer which amplifies the analog gradation voltage to output a source line driving voltage to a load circuit in a display panel of a display device;

a switch which turns off when a first power voltage which drives the source driver circuit is blocked, and turns on when the first power voltage is supplied; and a power-off discharge circuit which discharges the load circuit when the first power voltage is blocked by coupling the load circuit to substantially a ground voltage, and which does not discharge the load circuit when the first power voltage is supplied.

13. The circuit of claim 12, wherein the first power voltage is blocked when the source driver circuit enters into a power-off state, and the first power voltage is supplied when the source driver circuit operates in a power-on state.

14. The circuit of claim 12, wherein the power-off discharge circuit comprises:

a power voltage detection unit which detects whether the first power voltage is blocked and generates a discharge control signal for discharging the load circuit upon detection that the first power voltage is blocked; and a discharge unit which discharges the load circuit based on the discharge control signal by coupling the load circuit to substantially a ground voltage.

15. The circuit of claim 14, wherein the power-off discharge circuit further comprises:

a driving voltage generation unit which generates a second power voltage which drives the power voltage detection unit based on the first power voltage.

16. The circuit of claim 15, wherein the power-off discharge circuit further comprises:

a level shift unit which performs a level shifting operation on the voltage level of the discharge control signal based on the first power voltage.

* * * * *

UNITED STATES PATENT AND TRADEMARK OFFICE

CERTIFICATE OF CORRECTION

PATENT NO. : 8,619,069 B2
APPLICATION NO. : 12/825735
DATED : December 31, 2013
INVENTOR(S) : Ko et al.

It is certified that error appears in the above-identified patent and that said Letters Patent is hereby corrected as shown below:

In the Claims:

Column 14, lines 66, delete "power voltage which drives a source driver circuit is" and insert -- power voltage which drives the source driver circuit is --.

Signed and Sealed this
Twenty-second Day of April, 2014

Michelle K. Lee
*Deputy Director of the United States Patent and Trademark Office*